Nov. 6, 1962     R. L. HAMMERSLEY     3,062,233
COLD WATER INLET FOR WATER HEATING TANKS
Filed Aug. 22, 1960
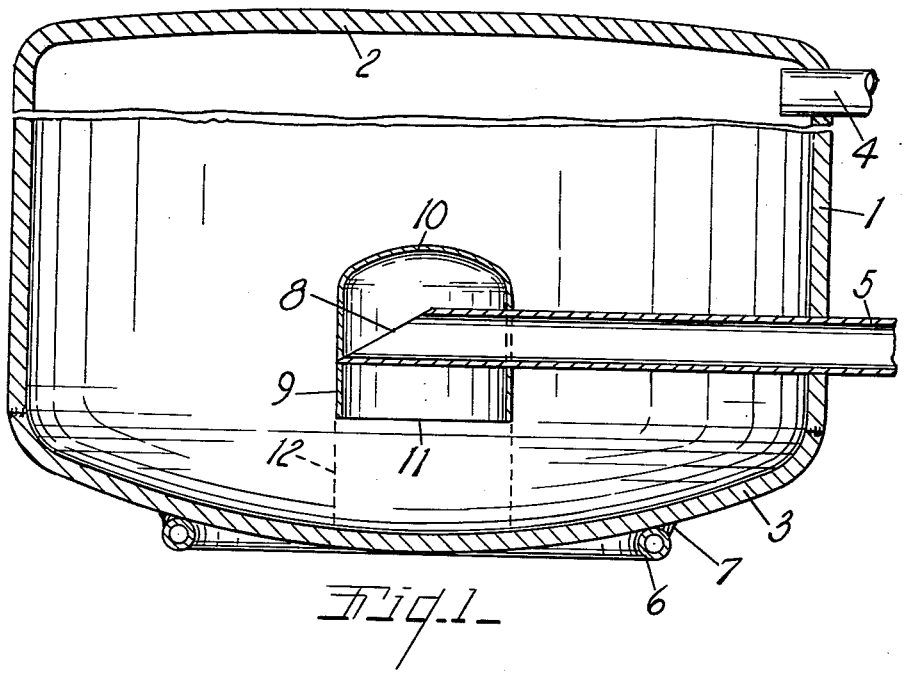
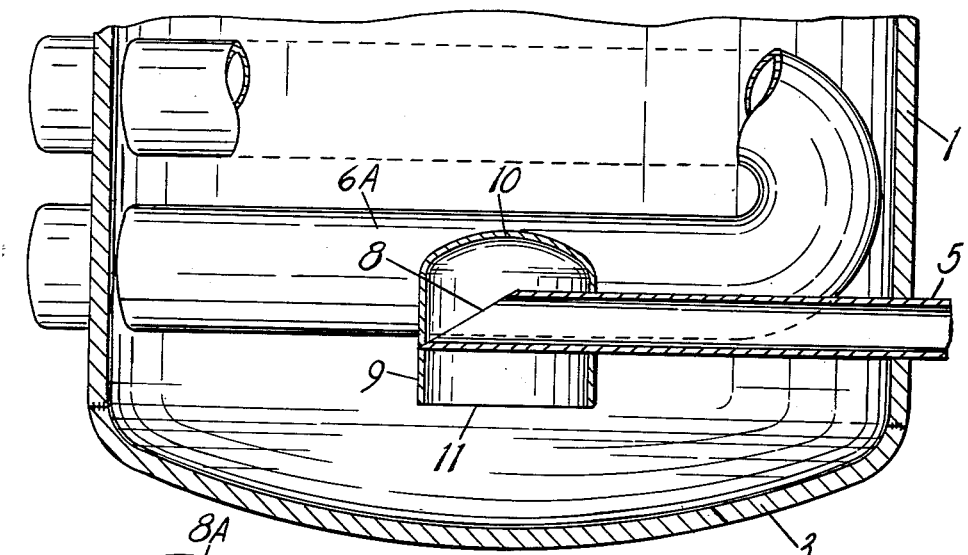
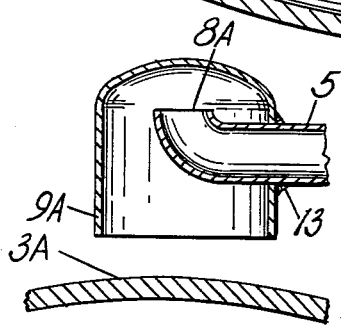
INVENTOR.
Richard L. Hammersley
BY Otis A. Earl
ATTORNEY.

United States Patent Office 3,062,233
Patented Nov. 6, 1962

3,062,233
COLD WATER INLET FOR WATER HEATING TANKS
Richard L. Hammersley, Livonia, Mich., assignor to Handling Equipment Manufacturing Corporation, Wixon, Mich.
Filed Aug. 22, 1960, Ser. No. 51,085
4 Claims. (Cl. 137—592)

This invention relates to improvements in cold water inlet for water heating tanks. The principal objects of this invention are:

First, to provide a cold water inlet for a heating tank which will permit a high percentage of the hot water in the tank to be withdrawn without dilution or reduction in temperature by reason of incoming cold water.

Second, to provide a cold water inlet and baffle therefor for a water heating tank which will cause the incoming cold water to rise gradually in a plane in the tank rather than surge irregularly and mix with the hot water being displaced by the incoming cold water.

Third, to provide a novel form of baffle for the discharge end of a cold water inlet to a water heating tank which will slow down the flow of incoming water so that the cold water rises gradually in stratified condition in the bottom of the tank.

Other objects and advantages of the invention will be apparent from a consideration of the following description and claims.

FIG. 1 is a fragmentary vertical cross sectional view through an electrically heated water heating tank and the cold water inlet thereto.

FIG. 2 is a fragmentary vertical cross sectional view through a gas fired water heating tank and the cold water inlet thereto.

FIG. 3 illustrates a modified form of inlet baffle usable in either type of tank.

FIG. 1 illustrates a water heating tank 1 of generally cylindrical shape having a top wall 2 and a convexedly curved bottom wall 3. The outlet from which hot water is drawn off from the tank is indicated at the top of the tank at 4 and the inlet pipe through which cold water enters to replace the hot water is positioned near the bottom of the tank as at 5. An electrical heating element for heating water in the tank is indicated at 6 and is desirably welded to the bottom of the tank as at 7 to provide good heat conductivity.

The inlet pipe 5 extends to near the center of the tank 1 and has a beveled upwardly opening inner end 8. The inlet end 8 and the inner end of the pipe 5 are enclosed by a downwardly opening cylindrical baffle 9 having a domed and closed upper end 10. The size of the cylindrical baffle 10 is such that the area of its open lower end 11 is substantially greater than the area of the baffled inlet end 8 of the pipe. The bottom of the baffle 9 is spaced vertically above the bottom wall 3 of the tank by a distance providing approximately the same or greater area in the cylindrical area defined by a continuation of the cylindrical shape of the baffle 9 to the bottom wall 3, as indicated by the dotted lines 12, as the central area of the lower end of the baffle 11.

In operation of the water heating tank the heating element 6 heats the entire contents of the tank to a predetermined temperature determined by a thermostat (not illustrated) associated with the tank and heating element. This is an old expedient. As hot water is drawn off through the outlet 4, cold water enters through the inlet opening 8 and is directed upwardly against the underside of the domed end of the baffle and due to the increased area in the baffle the velocity of the flowing water is reduced considerably. The cold water flows downwardly through the lower open end 11 and its velocity is further reduced by the increased area at the lower end 11 so that a relatively slow stream of water is directed downwardly toward the bottom of the tank. The slowly moving column of water expands or flows radially from the cylindrical area 12 further reducing the velocity of the water so that the cold water entering the tank proper is moving very slowly and rises in a plane without materially intermixing with the hot water being drawn off and without lowering the temperature of the hot water.

With an arrangement of the structure shown in which the cold water inlet pipe 5 is about a ¾" pipe and in which the baffle 9 is about 2½" in diameter and about 2½" high, it has been found that positioning the bottom open end 11 of the baffle between ½" and 1½" above the bottom of the tank permits 14 gallons of hot water to be drawn from an 18 gallon tank without any measurable reduction in the initial temperature of the hot water in the tank. This is especially desirable in small volume water heating tanks such as are used in mobile homes and trailers.

The modified form of water heater shown in FIG. 2 is the same as that shown in FIG. 1 except that a U-shaped heater tube 6A is projected through the side wall of the tank closely adjacent to the baffle 10 and the inlet pipe 5 for directing the flame and gases of a gas burner through the lower portion of the tank to heat the water. The baffle 10 and inlet 5 function in the same manner as in the electrically heated tank to stratify the incoming cold water and permit withdrawal of a high proportion of the hot water without loss of temperature.

The modified form of inlet and baffle shown in FIG. 3 is usable in either a gas fired or electrically heated tank. In this assembly, the inlet pipe 5 is provided with an upwardly turned vertically discharging inlet opening 8a. In this embodiment the bottom 3A is concave instead of being convex as is shown in FIGS. 1 and 2. Both the convexedly and concavedly curved bottoms effectively direct the incoming water to the heating element 6 or 6A. The hood or baffle 9A is essentially the same as the baffles 9 except that it engages and is secured to the inlet pipe on one side only as at the weld 13. Other variations of the inlet and baffle are possible within the scope of the following claims.

What is claimed as new is:

1. A flow directing baffle and inlet for reducing the velocity of liquid entering a tank having a bottom wall and for eliminating turbulence in the tank comprising, an inlet pipe extending through a side wall of said tank to a laterally directed position centrally of the tank and spaced above the bottom wall, an upwardly beveled end on said pipe forming an upwardly and inwardly directed inlet opening, and a cylindrical baffle surrounding the opening and the inner end of said pipe and having an upwardly convex closed upper end spaced above said opening, the pointed inner end at the end of the bevel on said pipe being supportingly engaged with the wall of said baffle, the lower end of said baffle extending substantially below said pipe and having a cross-sectional area greater than the area of the opening in said pipe, the bottom of said baffle being spaced from the bottom wall of the tank so that the cylindrical area defined by a projected continuation of the lower end of said baffle to the bottom of the tank is approximately as great as the area of the lower end of the baffle.

2. A flow directing baffle and inlet for reducing the velocity of liquid entering a tank having a bottom wall and for eliminating turbulence in the tank comprising, an inlet pipe extending through a side wall of said tank to a laterally directed position centrally of the tank and spaced above the bottom wall, an upwardly beveled end on said pipe forming an upwardly and inwardly directed inlet opening, and a cylindrical baffle surrounding the opening and the inner end of said pipe and having an upwardly convex closed upper end spaced above said opening, the lower end of said baffle extending substantially below said pipe and having a cross-sectional area greater than the area of the opening in said pipe, the bottom of said baffle being spaced from the bottom wall of the tank so that the cylindrical area defined by a projected continuation of the lower end of said baffle to the bottom of the tank is approximately as great as the area of the lower end of the baffle.

3. A flow directing baffle and inlet for reducing the velocity of liquid entering a tank having a bottom wall and for eliminating turbulence in the tank comprising, an inlet pipe extending through a wall of said tank to a laterally directed position centrally of the tank and spaced above the bottom wall, an upwardly beveled end on said pipe forming an upwardly and inwardly directed inlet opening, and an annular baffle surrounding the opening and the inner end of said pipe and having an upwardly convex closed upper end spaced above said opening, the lower end of said baffle extending substantially below said pipe and having a cross-sectional area greater than the area of the opening in said pipe, the bottom of said baffle being spaced from the bottom wall of the tank so that the annular area defined by a projected continuation of the lower end of said baffle to the bottom of the tank is approximately as great as the area of the lower end of the baffle.

4. A flow directing baffle and inlet for reducing the velocity of liquid entering a tank having a bottom wall and for eliminating turbulence in the tank comprising, an inlet pipe extending through a wall of said tank to a laterally directed position centrally of the tank and spaced above the bottom wall, the end on said pipe forming an upwardly directed inlet opening, and an annular baffle surrounding the opening and the inner end of said pipe and having an upwardly convex closed upper end spaced above said opening, the lower end of said baffle extending substantially below said pipe and having a cross-sectional area greater than the area of the opening in said pipe, the bottom of said baffle being spaced from the bottom wall of the tank so that the annular area defined by a projected continuation of the lower end of said baffle to the bottom of the tank is approximately as great as the area of the lower end of the baffle.

References Cited in the file of this patent

UNITED STATES PATENTS

| | | |
|---|---|---|
| 608,148 | Brooks | July 26, 1898 |
| 1,070,734 | Rittershaussen | Aug. 19, 1913 |
| 2,123,809 | Seitz | July 12, 1938 |
| 2,228,471 | McKee | Jan. 14, 1941 |
| 2,385,854 | Wolfersperger | Oct. 2, 1945 |
| 2,414,875 | Horne | Jan. 28, 1947 |
| 2,553,212 | Rouis | May 15, 1951 |
| 2,636,512 | Smith | Apr. 28, 1953 |
| 2,711,756 | Peck et al. | June 28, 1955 |
| 2,861,169 | Bowen et al. | Nov. 18, 1958 |

FOREIGN PATENTS

| | | |
|---|---|---|
| 183,406 | Switzerland | June 16, 1936 |
| 375,800 | Great Britain | June 22, 1932 |
| 479,609 | Great Britain | Feb. 9, 1938 |
| 729,028 | Germany | Dec. 9, 1942 |